US012346450B2

(12) United States Patent
Kim

(10) Patent No.: US 12,346,450 B2
(45) Date of Patent: Jul. 1, 2025

(54) ELECTRONIC DEVICE AND SECURE BOOTING METHOD THEREOF

(71) Applicant: SAMSUNG ELECTRONICS CO., LTD., Suwon-si (KR)

(72) Inventor: John Hongjip Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 245 days.

(21) Appl. No.: 18/330,584

(22) Filed: Jun. 7, 2023

(65) Prior Publication Data

US 2024/0193275 A1   Jun. 13, 2024

(30) Foreign Application Priority Data

Dec. 9, 2022   (KR) ................. 10-2022-0171828

(51) Int. Cl.
*G06F 21/57* (2013.01)
*G06F 21/12* (2013.01)

(52) U.S. Cl.
CPC .......... *G06F 21/575* (2013.01); *G06F 21/123* (2013.01)

(58) Field of Classification Search
CPC .......... G06F 21/123; G06F 21/57–575; G06F 21/602; G06F 21/604
See application file for complete search history.

(56) References Cited

U.S. PATENT DOCUMENTS

| 10,701,046 | B1 | 6/2020 | Kaliski, Jr. et al. |
| 11,405,213 | B2 | 8/2022 | Ghosh et al. |
| 2007/0266446 | A1* | 11/2007 | Aaron ............. G06F 21/10 726/30 |
| 2021/0126801 | A1 | 4/2021 | Nix |
| 2021/0199467 | A1* | 7/2021 | Bellifemine ........ B60L 53/665 |
| 2021/0377049 | A1* | 12/2021 | Nix .................. H04L 9/0877 |
| 2022/0100873 | A1 | 3/2022 | Yoon |
| 2022/0131708 | A1 | 4/2022 | Ghosh et al. |
| 2022/0209944 | A1 | 6/2022 | Nix |

OTHER PUBLICATIONS

Albrecht, et al., "Implementing RLWE-based Schemes Using an RSA Co-Processor", in IACR Transactions on Cryptographic Hardware and Embedded Systems ISSN 2569-2925, vol. 2019, No. 1, pp. 169-208.

Burstinghaus-Steinbach, et al., "Post-Quantum TLS on Embedded Systems; Integrating and Evaluating Kyber and SPHINCS+ with mbed TLS", in ASIA CCS '20, Oct. 5-9, 2020, Taipei, Taiwan, 12 pages.

Crockett, et al., "Prototyping post-quantum and hybrid key exchange and authentication in TLS and SSH", Jul. 19, 2019, pp. 1-24.

(Continued)

*Primary Examiner* — Kevin Bechtel
(74) *Attorney, Agent, or Firm* — MORGAN, LEWIS & BOCKIUS LLP

(57) ABSTRACT

An electronic device loads a boot code and checks a select bit. When the select bit has a first value, the electronic device verifies the boot code based on a pre-quantum cryptography algorithm. If verification of the boot code fails, the electronic device verifies the boot code based on a post-quantum cryptography algorithm. If verification of the boot code based on the post-quantum cryptography algorithm is successful, the electronic device sets the select bit to a second value.

20 Claims, 13 Drawing Sheets

(56) References Cited

OTHER PUBLICATIONS

Computing Community Consortium, "Identifying Research Challenges in Post Quantum Cryptography Migration and Cryptographic Agility", CCC Workshop, Washington, D.C., Jan. 31-Feb. 1, 2019, 30 pages.

Fritzmann, et al., "RISQ-V: Tightly Coupled RISC-V Accelerators for Post-Quantum Cryptography", In IACR Transactions on Cryptographic Hardware and Embedded Systems ISSN 2569-2925, vol. 2020, No. 4, pp. 239-280. DOI:10.13154/tches.v2020.i4.239-280.

Zhang, et al., "Towards Efficient Hardware Implementation of NTT for Kyber on FPGAs", in IEEE International Symposium on Circuits and Systems (ISCAS), 2021, 5 pages, DOI: 10.1109/ISCAS51556.2021.9401170.

\* cited by examiner

ELECTRONIC DEVICE AND SECURE BOOTING METHOD THEREOF

CROSS-REFERENCE TO RELATED APPLICATION

This application claims priority under 35 U.S.C. § 119 to Korean Patent Application No. 10-2022-0171828 filed in the Korean Intellectual Property Office on Dec. 9, 2022, the disclosure of which is incorporated by reference herein in its entirety.

BACKGROUND

The present disclosure relates to an electronic device and a secure booting method of the electronic device.

Many devices currently use digital signature methods based on public key cryptography, such as Rivest-Shamir-Adleman (RSA) or elliptic curve digital signature algorithm (ECDSA). Some devices store parameters of these public key cryptosystems as immutable code to use in secure boot and firmware update operations. These operations ensure that after devices are deployed in a customer environment, only authenticated firmware may be used for the firmware update in the field. Once the devices are deployed, a device manufacturer may update the devices in the customer environment with a new firmware.

Developments in quantum computing may enable quantum computing devices to break RSA/ECDSA public-key cryptosystems that classical computers cannot. Therefore, the National Institute of Standards and Technology (NIST) has recommended standardizing cryptographic systems to new post-quantum cryptography (PQC) in preparation for the practical use of quantum computers. Systems that use RSA/ECDSA instead of PQC may be risk security breach in the future. However, the transition to the PQC can be difficult if the RSA/ECDSA parameters used for a secure boot are stored as an immutable code. If these parameters are stored in mutable code to enable a networked update for PQC, then attackers may be able to compromise the systems by modifying the parameters without making changes in hardware. Instead, systems based on pre-quantum cryptographic algorithms may be replaced if quantum computing becomes standardized. This process is costly and may leave the systems vulnerable until they are serviced. Accordingly, there is a need in the art for systems and methods to implement both RSA/ECDSA and PQC while maintaining the security provided by immutable code.

SUMMARY

Some embodiments may provide an electronic device and a secure booting method thereof, for supporting both pre-quantum cryptography and post-quantum cryptography.

According to some embodiments, an electronic device includes a one-time programmable (OTP) memory configured to store a select bit, a storage device configured to store a boot code, and a processor. The processor is configured to verify the boot code based on the select bit. The processor verifies the boot code based on a pre-quantum cryptography algorithm when the select bit has a first value, and the processor verifies the boot code based on a post-quantum cryptography algorithm when the select bit has a second value.

According to some embodiments, an electronic device includes an OTP memory configured to store a select bit, a storage device configured to store a boot code, a pre-quantum cryptography cryptoprocessor, and a post-quantum cryptography cryptoprocessor. The pre-quantum cryptography cryptoprocessor executes a pre-quantum cryptography algorithm to verify the boot code when the select bit has a first value. The post-quantum cryptography cryptoprocessor executes a post-quantum cryptography algorithm to verify the boot code when the select bit has a second value.

According to some embodiments, a method of performing a secure boot of an electronic device includes loading a first boot code, attempting to verify the first boot code based on a pre-quantum cryptography algorithm, determining that the attempt to verify the first boot code using the pre-quantum cryptography algorithm has failed, verifying the first boot code using a post-quantum cryptography algorithm based on the determination, and setting a select bit to a value indicating post-quantum cryptography.

DETAILED DESCRIPTION

Figure 1:
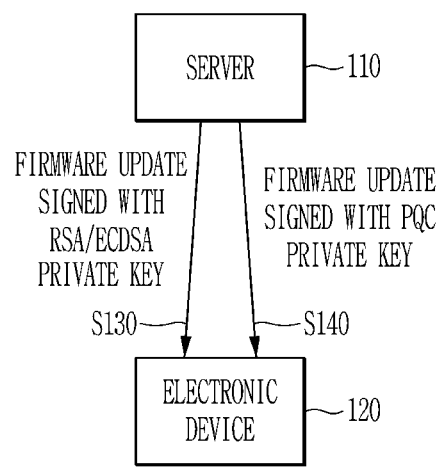
FIG. 1 is a diagram that illustrates an example of a security system according to some embodiments.

The following detailed description describes embodiments of the present disclosure with reference to the accompanying drawings. Those skilled in the art will appreciate that the described embodiments may be modified in various different ways without departing from the spirit or scope of the invention.

Accordingly, the drawings and description are to be regarded as illustrative in nature and not restrictive. Like reference numerals designate like elements throughout the specification. The sequence of operations or steps are not necessarily limited to the order presented in the claims or figures, unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

FIG. 1 is a diagram that illustrates an example of a security system according to some embodiments.

Referring to FIG. 1, a security system 100 may include a server 110 and an electronic device 120 connected to the server 110 via a communication network.

The server 110 may provide the electronic device 120 with a firmware update signed based on a pre-quantum cryptography algorithm in S130, such as RSA, DSA, or ECDSA. In some embodiments, the firmware update signed based on the pre-quantum cryptography algorithm may be a firmware update signed with a pre-quantum cryptography private key. Some point in time after deployment of the electronic device (e.g., after quantum computing becomes commercialized), the server 110 may provide a firmware update signed based on a post-quantum cryptography (PQC) algorithm to the electronic device 120 in S140. In some embodiments, the firmware update signed based on the PQC algorithm may be a firmware update signed with a PQC private key.

The pre-quantum cryptography may include, for example, Rivest-Shamir-Adleman (RSA), digital signature algorithm (DSA), elliptic curve digital signature algorithm (ECDSA), Edwards-curve digital signature algorithm (EdDSA), Diffie-Hellman, and/or elliptic curve cryptography (ECC). Hereinafter, for convenience, the pre-quantum cryptography is described as the RSA/ECDSA.

The electronic device 120 may support both the RSA/ECDSA and the PQC for a secure boot. The electronic device 120 may initially perform the secure boot based on the RSA/ECDSA. In some cases, such as after a firmware update signed based on a PQC algorithm is provided from the server 110, the electronic device 120 may fail to verify a boot code using the RSA/ECDSA algorithm. In this case, the electronic device 120 may load and verify the boot code using the PQC algorithm. If the verification is successful, the electronic device 120 may disable the RSA/ECDSA and enable the PQC. In some embodiments, the electronic device 120 may disable the RSA/ECDSA and enable PQC by setting a select bit indicating the PQC to a predetermined value. In at least one embodiment, the electronic device 120 may not set a predetermined value, and may perform the load and verification process for each boot. In some embodiments, the select bit may be stored within an immutable memory, such as a one-time programmable (OTP) memory. The boot code may be referred to as a bootloader. If the firmware update is provided from the server 110, the electronic device 120 may update a firmware via the secure boot.

Figure 2:
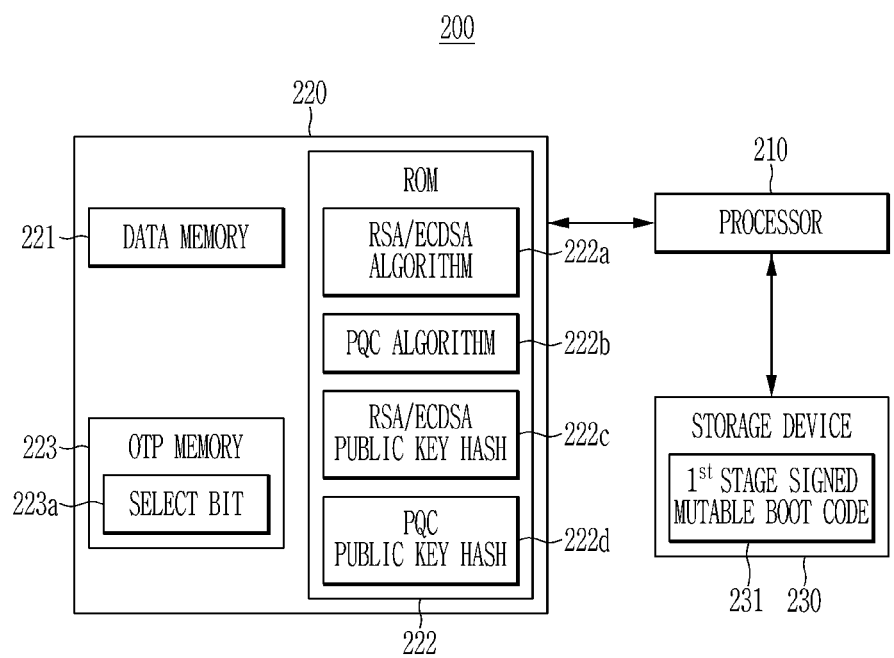
FIG. 2 and FIG. 3 each are block diagrams that illustrate an example of an electronic device according to some embodiments.
Figure 3:
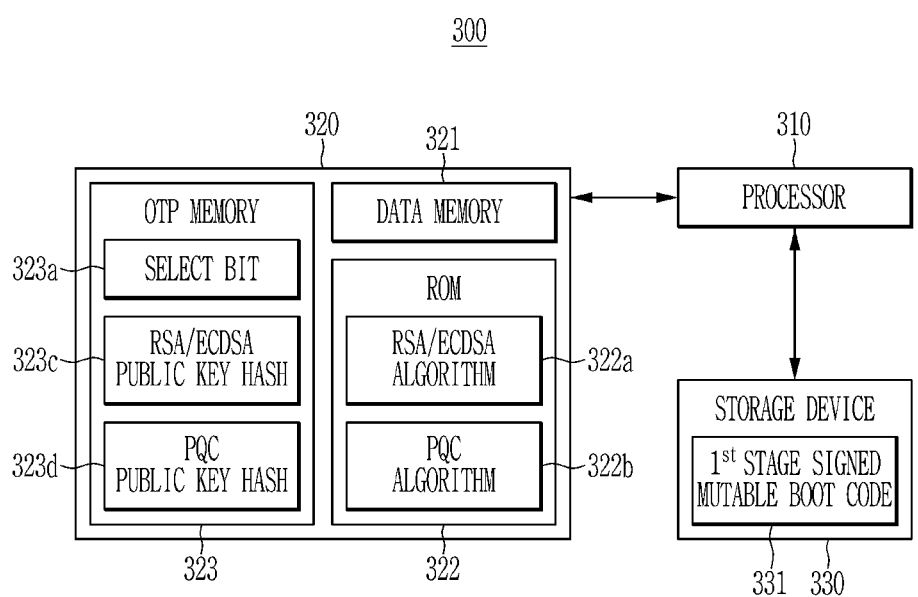

FIG. 2 and FIG. 3 each are block diagrams that illustrate an example of an electronic device according to some embodiments. Embodiments of the electronic device may include an electronic device with an interface such as a terminal or a command line interface, a graphical user interface, a keyboard and mouse, or other interface components. Some embodiments of the electronic device may include a "headless" system without the aforementioned interface components, such as an embedded system.

Referring to FIG. 2, an electronic device 200 may include a processor 210, a memory unit 220, and a storage device 230.

The processor 210 may control an overall operation of the electronic device 200. The processor 210 may be implemented as at least one of various processing units, such as a central processing unit (CPU), an application processor (AP), and a graphic processing unit (GPU). In some embodiments, the processor 210 may be implemented as an integrated circuit such as a system on chip (SoC).

The memory unit 220 may include a data memory 221, a read only memory (ROM) 222, and an OTP memory 223. In some embodiments, the memory unit 220 may be implemented separately from the processor 210. In some other embodiments, at least one of the data memory 221, the ROM 222, and the OTP memory 223 may be implemented as the integrated circuit together with the processor 210.

The data memory 221 may be a memory that is accessed and used by the processor 210. In some embodiments, the data memory 221 may include a volatile memory. The data memory 221 may include, for example, a random-access memory (RAM), such as a static random-access memory (SRAM) or a dynamic random-access memory (DRAM). In at least one embodiment, the data memory 221 may include a non-volatile memory such as a flash memory.

The ROM 222 may include a read-only memory. The ROM 222 may represent an immutable root of trust and may store an immutable secure boot code. The immutable secure boot code may include an RSA/ECDSA algorithm 222a and a PQC algorithm 222b. In addition, the ROM 222 may store a hash value 222c of an RSA/ECDSA public key and a hash value 222d of a PQC public key as an immutable anchor in hardware fuses. In some embodiments, the hash value 222c of the RSA/ECDSA public key and the hash value 222d of the PQC public key may be provisioned at a time of manufacturing of the electronic device 200.

The OTP memory 223 may store a select bit 223a, which may be set to a predetermined value (e.g., '1') when an algorithm is transitioned from an RSA/ECDSA algorithm (e.g., an RSA/ECDSA digital signature verification method) to a PQC algorithm (e.g., a PQC digital signature verification method). For example, the select bit 223a may be set upon a determination by the system that all future digital signatures will be implemented using the PQC digital signature verification method. This determination may be made, for example, when a pre-quantum computing method fails to verify the digital signature during a boot or firmware update process.

The storage device 230 may store a boot code 231. In some embodiments, the boot code 231 may include the first stage signed mutable boot code (or a signed mutable boot code of the first stage) in a secure boot, and the first stage may be the first stage of the secure boot. In some embodiments, the storage device 230 may further include an additional stage signed mutable boot code. Mutable boot code may be differentiated from ROM 222 in that it may be modified during a boot or update process, so as to be adaptable to updates in security policy.

The storage device 230 may be implemented as a non-volatile memory. In some embodiments, the storage device 230 may be removably connected to the electronic device 200. In some other embodiments, the storage device 230 may be integrated within the electronic device 200 or may be non-removably connected to the electronic device 200. In some embodiments, the non-volatile memory may include a flash-based memory such as a NAND flash memory. In this case, the storage device 230 may be, for example, a universal serial bus (USB) flash drive, a universal flash storage (UFS), or a solid-state drive (SSD). In some other embodiments, the non-volatile memory may include, for example, a phase-change memory, a resistive memory, a magnetoresistive memory, a ferroelectric memory, or a polymer memory.

The processor 210 may execute the immutable boot code in the ROM 222 and load the first stage signed mutable boot code 231 into the data memory 221 and verify the first stage signed mutable boot code 231 using either the RSA/ECDSA algorithm 222a or the PQC algorithm 222b. The processor 210 may determine which of the RSA/ECDSA algorithm 222a and the PQC algorithm 222b to use based on a value of the select bit 223a in the OTP memory 223. If the select bit 223a of the OTP memory 223 has a first value (e.g., '0'), the processor 210 may use the RSA/ECDSA algorithm 222a to verify a digital signature of the first stage signed mutable boot code 231. If the select bit 223a of the OTP memory 223 has a second value (or a predetermined value) (e.g., '1'), the processor 210 may use the PQC algorithm 222b to verify the digital signature of the first stage signed mutable boot code 231.

If the processor 210 fails to verify the digital signature of the first stage signed mutable boot code 231 using the RSA/ECDSA algorithm 222a, the processor 210 may use the PQC algorithm 222b to verify the digital signature of the first stage signed mutable boot code 231. In some cases, the processor 210 may output a failure signal if it fails to verify the digital signal.

If the processor 210 is successful in verifying the digital signature of the first stage signed mutable boot code 231, the processor 210 may set the select bit 223a to the second value. In some embodiments, the processor 210 may set the select bit 223a to the second value by programming (or blowing) the select bit 223a. For example, some embodiments of the present disclosure may blow the select bit 223a such that it cannot be reverted to a '0' value, thereby preventing an attacker from attempting to use a pre-quantum digital signature verification method.

After verifying an authenticity of the first stage signed mutable boot code 231 by verifying its digital signature (i.e., after successful verification), the processor 210 may execute the first stage signed mutable boot code 231, and load a next stage signed mutable boot code or an application code into the data memory 221 from the storage device 230. Accordingly, the electronic device 300 may verify the next stage signed mutable boot code or the application code and, if the verification is successful, execute the code.

Referring to FIG. 3, an electronic device 300 may include a processor 310, a memory unit 320, and a storage device 330. The memory unit 320 may include a data memory 321, a ROM 322, and an OTP memory 323. The ROM 322 may store an RSA/ECDSA algorithm 322a and a PQC algorithm 322b. The OTP memory 323 may include a select bit 323a, and the storage device 330 may store a boot code 331.

As shown in FIG. 3, unlike embodiments described with reference to FIG. 2, instead of the ROM 322, the OTP memory 323 may additionally store a hash value 323c of an RSA/ECDSA public key and a hash value 323d of a PQC public key. Accordingly, the electronic device 300 may operate similarly to the electronic device 200 described with reference to FIG. 2, except that the processor 310 may load the hash value 323c of the RSA/ECDSA public key and the hash value 323d of the PQC public key from the OTP memory 323, and a detailed description thereof is omitted. In some embodiments, the OTP memory 323 may be configured to be replaced by a manufacturer of the electronic device 300, for example, if the RSA/ECDSA or PQC public key were to change.

Figure 4:
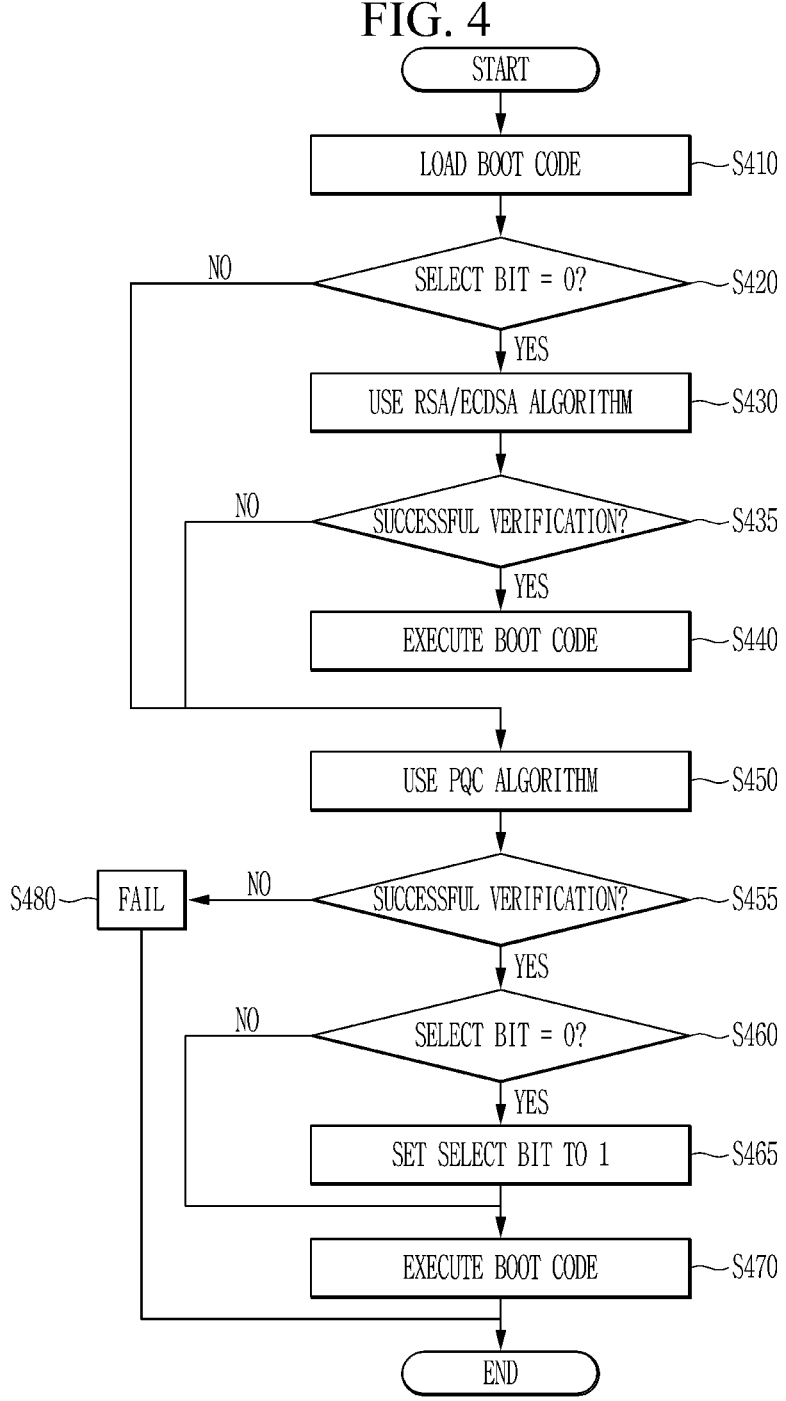
FIG. 4 is a flow diagram that illustrates an example of a secure booting method of an electronic device according to some embodiments.

FIG. 4 is a flow diagram that illustrates an example of a secure booting method of an electronic device according to some embodiments.

Referring to FIG. 2 and FIG. 4, a processor 210 of an electronic device may execute an immutable boot code stored in a ROM 222. Upon execution of the immutable boot code, the processor 210 may load a boot code from a storage device 230 into a data memory 221 in S410. In some embodiments, the boot code may be a first stage signed mutable boot code. In some embodiments, the processor 210 may load the first stage signed mutable boot code from the storage device 230 into the data memory 221 by executing the immutable boot code of the ROM 222 in S410.

The processor 210 may check a select bit 223a of an OTP memory 223 in S420. If the select bit 223a has a first value (e.g., '0') in S420, the processor 210 may use an RSA/ECDSA algorithm for a secure boot in S430. In some embodiments, the processor 210 may use the RSA/ECDSA algorithm stored in the ROM 222 to verify a signature of the first stage signed mutable boot code based on a hash value of an RSA/ECDSA public key stored in the ROM 222 in S430. If the verification is successful in S435, the processor 210 may execute the first stage signed mutable boot code in S440. In some embodiments, if the first stage signed mutable boot code includes a new firmware image, the processor 210 may perform a firmware update.

If the verification fails in S435, the processor 210 may use a PQC algorithm for the secure boot in S450. Embodiments described herein are not limited to any particular PQC algorithm. For example, embodiments may implement a Merkle signature scheme, a Winternitz signature scheme, various lattice-based signature schemes, a McEliece signature scheme, or a Niederreiter signature scheme. As of this writing, there are several PQC algorithms under development, and embodiments of the present disclosure are configured to use various PQC algorithms without departing from the scope of the invention.

In some embodiments, the processor 210 may use the PQC algorithm stored in the ROM 222 to verify the signature of the first stage signed mutable boot code based on a hash value of a PQC public key stored in the ROM 222 (S450). If the verification is successful in S455, and the select bit 223a has the first value in S460, the processor 210 may change the select bit 223a from the first value to a second value (e.g., '1') (i.e., set the select bit 223a to the second value) in S465. Further, the processor 210 may execute the first stage signed mutable boot code in S470. If the select bit 223a has the second value in S460, the processor 210 may execute the first stage signed mutable boot code without setting the select bit 223a in S470. In some embodiments, the processor 210 may set the select bit 223a to the second value by programming (or blowing) the select bit 223a in the OTP memory 223. In some embodiments, once the select bit 223a of the OTP memory 223 is set to the second value, the OTP memory 223 may be immutable. In other words, once the select bit 223a of the OTP memory 223 is set to the second value, the electronic device may not be able to set a state of the select bit 223a back to the first value.

When verifying the select bit 223a of the OTP memory 223, if the select bit 223a has the second value (e.g., '1') in S420, the processor 210 may use the PQC algorithm without attempting to use the RSA/ECDSA algorithm for the secure boot in S450.

In some embodiments, if the verification fails in S455, the processor 210 may fail in the secure boot in S480. In some other embodiments, if the verification fails in S455, the processor 210 may perform operations to load, verify, and execute a different first stage signed mutable boot code. For example, the verification may fail in S455 due to an invalid certificate or signature.

In some embodiments, after the select bit 223a is set to the second value, if a new first stage signed mutable boot code is stored in the storage device 230 in accordance with a firmware update, the processor 210 may validate the new first stage signed mutable boot code using the PQC algorithm.

According to the above-described embodiments, when the firmware update that is signed based on the PQC algorithm is distributed as the quantum computing is commercialized, the electronic device may transition from the RSA/ECDSA algorithm to the PQC algorithm to perform the secure boot and the firmware update.

Figure 5:
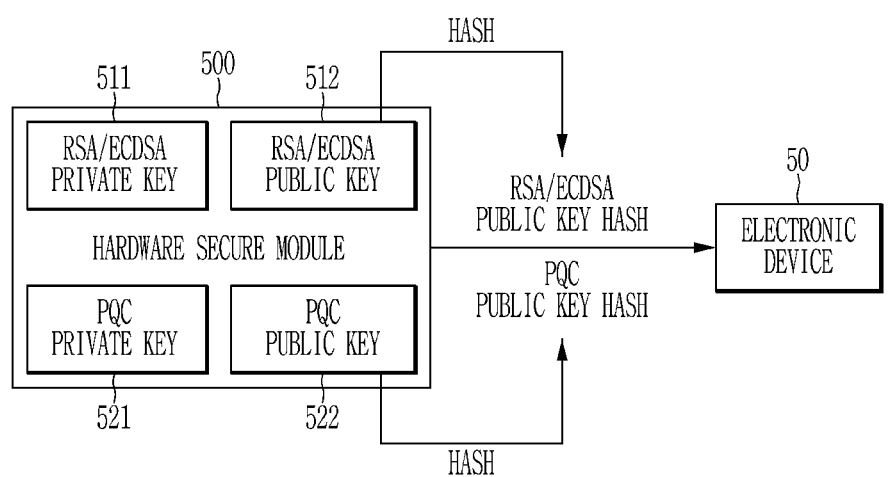
FIG. 5 is a diagram that illustrates an example of a pair of private and public keys according to some embodiments.
Figure 6:
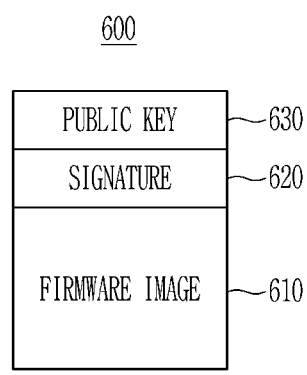
FIG. 6 is a diagram that illustrates an example of a boot code according to some embodiments.
Figure 7:
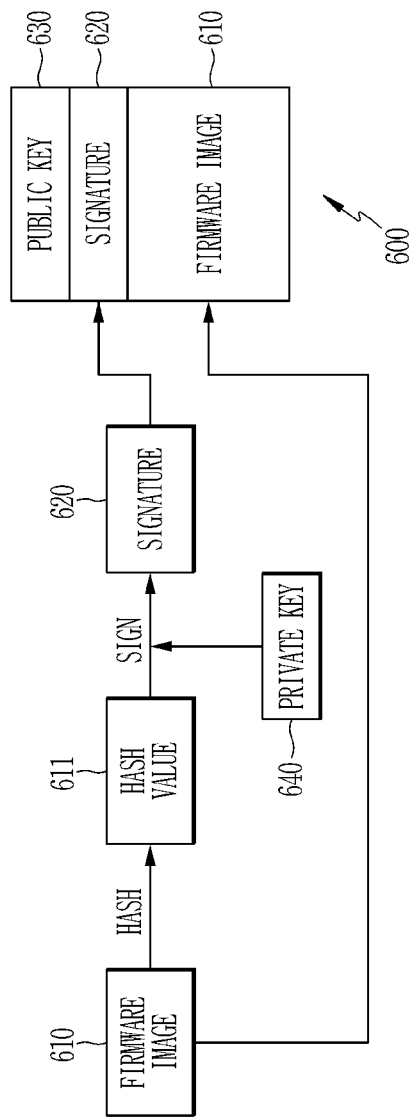
FIG. 7 is a diagram that illustrates an example of generating a boot code according to some embodiments.

FIG. 5 is a diagram that illustrates an example of a pair of private and public keys according to some embodiments, FIG. 6 is a diagram that illustrates an example of a boot code according to some embodiments, and FIG. 7 is a diagram that illustrates an example of generating a boot code according to some embodiments.

In some embodiments, referring to FIG. 5, a manufacturer of an electronic device 50 may use a computing device 500 to generate a unique pair of pre-quantum keys, such as an RSA/ECDSA private key 511 and an RSA/ECDSA public key 512, and a pair of post-quantum keys, such as a PQC private key 521 and a PQC public key 522. The computing device 500 may be, for example, a hardware secure module (HSM) 500. The manufacturer may store the RSA/ECDSA private key 511 and the PQC private key 521 in the HSM 500, hash the RSA/ECDSA public key 512 to generate a hash value of the RSA/ECDSA public key 512, and hash the PQC public key 522 to generate a hash value of the PQC public key 522. Further, the manufacturer may provision (e.g., provide) the hash value of the RSA/ECDSA public key 512 and the hash value of the PQC public key 522 to the electronic device 50. In some embodiments, the hash value of the RSA/ECDSA public key 512 and the hash value of the PQC public key 522 may be stored as immutable anchors in hardware fuses of a ROM in the electronic device 50.

In some embodiments, as shown in FIG. 6, a first stage signed mutable boot code 600 may include a firmware image 610. The first stage signed mutable boot code 600 may further include a signature 620 and a public key 630. In some cases, the firmware image 610 may be considered a payload, and the signature 620 and the public key 630 may be considered metadata. The signature 620 may be a hash value of the first stage signed mutable boot code 600 that is encrypted by using the RSA/ECDSA private key or the PQC private key, i.e., a hash value of the firmware image 610. If the RSA/ECDSA private key is used to generate the signature 620, the RSA/ECDSA public key 630 may be appended as metadata along with the signature 620. If the PQC private key is used to generate the signature 620, the PQC public key 630 may be appended as metadata along with the signature 620. In some cases, the signature 620 may be used to authenticate the provider of the firmware image 610.

In some embodiments, the first stage signed mutable boot code 600 may be generated by the manufacturer of the electronic device. Referring to FIG. 7, the manufacturer's computing device may hash the firmware image 610 to generate a hash value 611. The computing device may sign the hash value 611 of the firmware image 610 with a private key 640 to generate the signature 620, and append the signature 620, along with the public key 630 paired with the private key, to the firmware image 610 to generate the first stage signed mutable boot code 600. When the computing device signs the hash value 611 of the firmware image 610 with an RSA/ECDSA private key 640, the RSA/ECDSA public key 630 may be appended to the firmware image 610 along with the signature 620. At some point in time, e.g., when quantum computing is commercialized, the computing device may sign the hash value 611 of the firmware image 610 with a PQC private key 640, and append the RSA/ECDSA public key 630 to the firmware image 610 along with the signature 620. Accordingly, the computing device may provide the firmware update 600 signed with the PQC algorithm to the electronic device.

Figure 8:
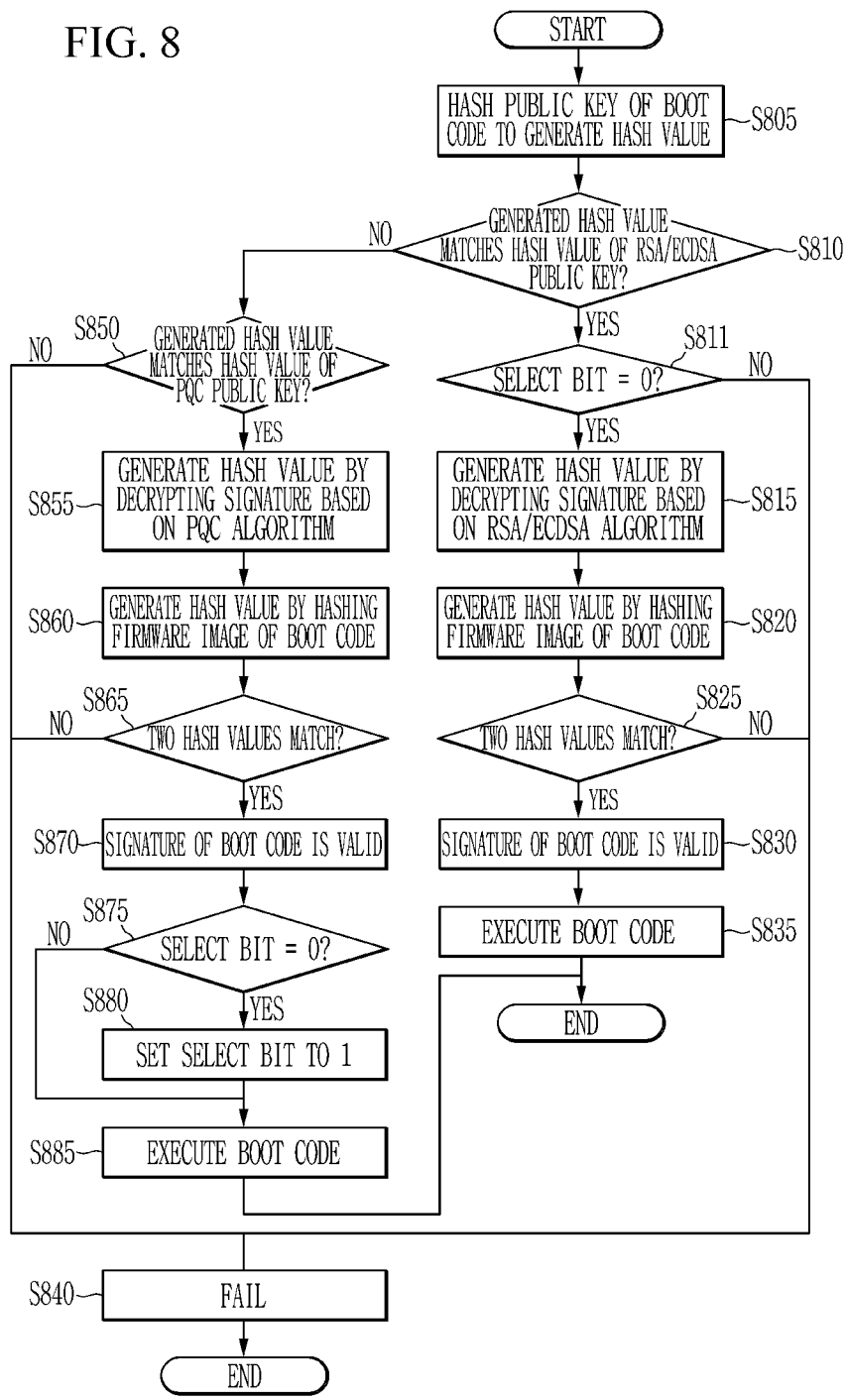
FIG. 8 and FIG. 10 are flowcharts that illustrate an example of a digital signature verification method in a secure booting method according to some embodiments.

A digital signature verification method according to some embodiments will now be described with reference to FIG. 8 to FIG. 10. FIG. 8 and FIG. 10 are flowcharts that illustrate an example of a digital signature verification method in a secure booting method according to some embodiments, and FIG. 9 illustrates an example of a digital signature verification method in a secure booting method according to some embodiments.

As described above, a hash value of an RSA/ECDSA public key and a hash value of a PQC public key may be provisioned in an ROM (e.g., 222 in FIG. 2) of an electronic device (e.g., 200 in FIG. 2). The RSA/ECDSA public key and the PQC public key may be an RSA/ECDSA public key and a PQC public key of a firmware signer (e.g., a manufacturer), respectively. In some embodiments, the hash values of the public keys may be stored into immutable efuses. As described with reference to FIG. 4, during the secure boot, a processor (e.g., 210 in FIG. 2) may load the first stage signed mutable boot code from a storage device (e.g., 230 in FIG. 2) into a memory (e.g., 221 in FIG. 2).

Figure 9:
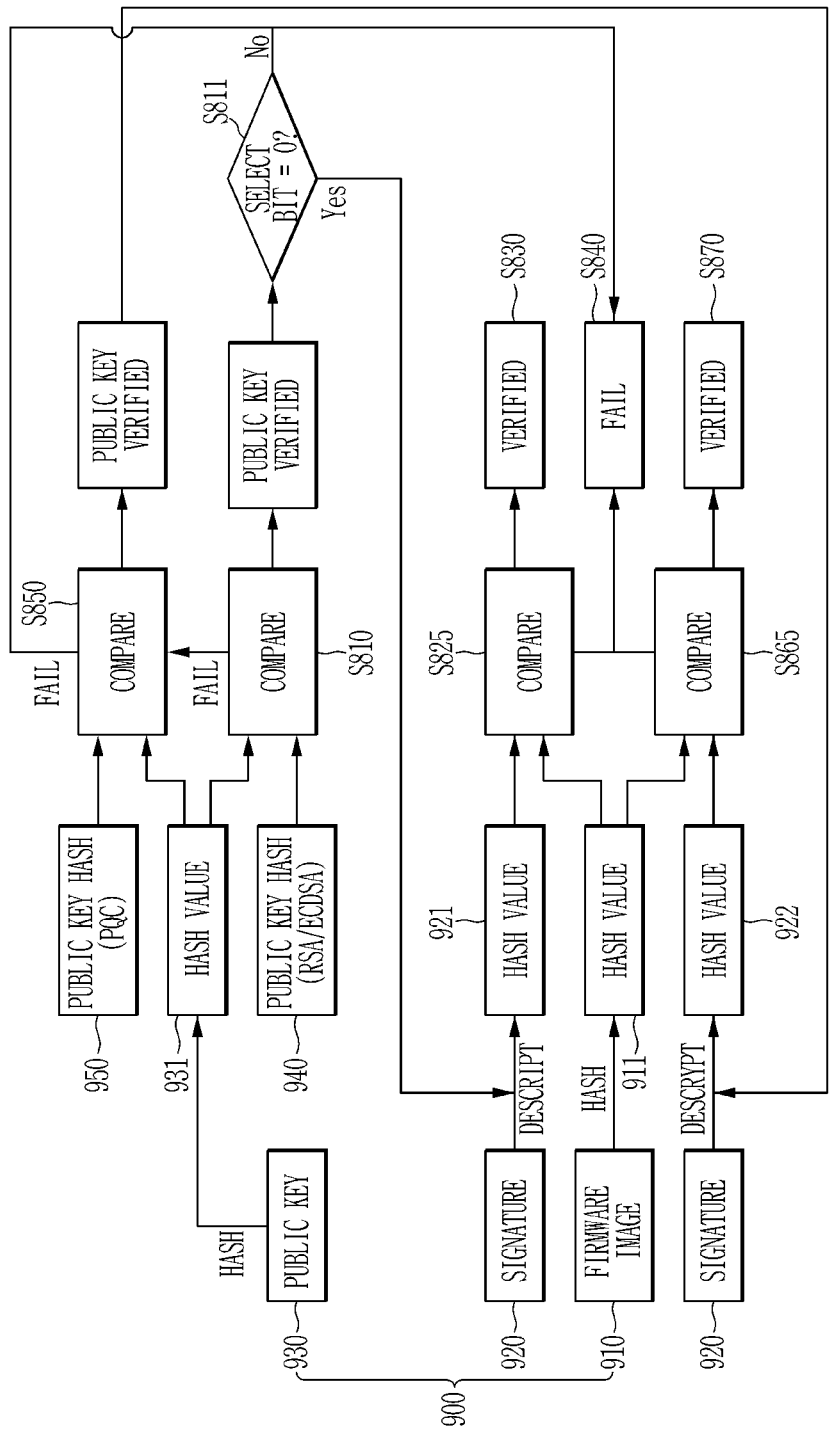
FIG. 9 illustrates an example of a digital signature verification method in a secure booting method according to some embodiments.
Figure 10:
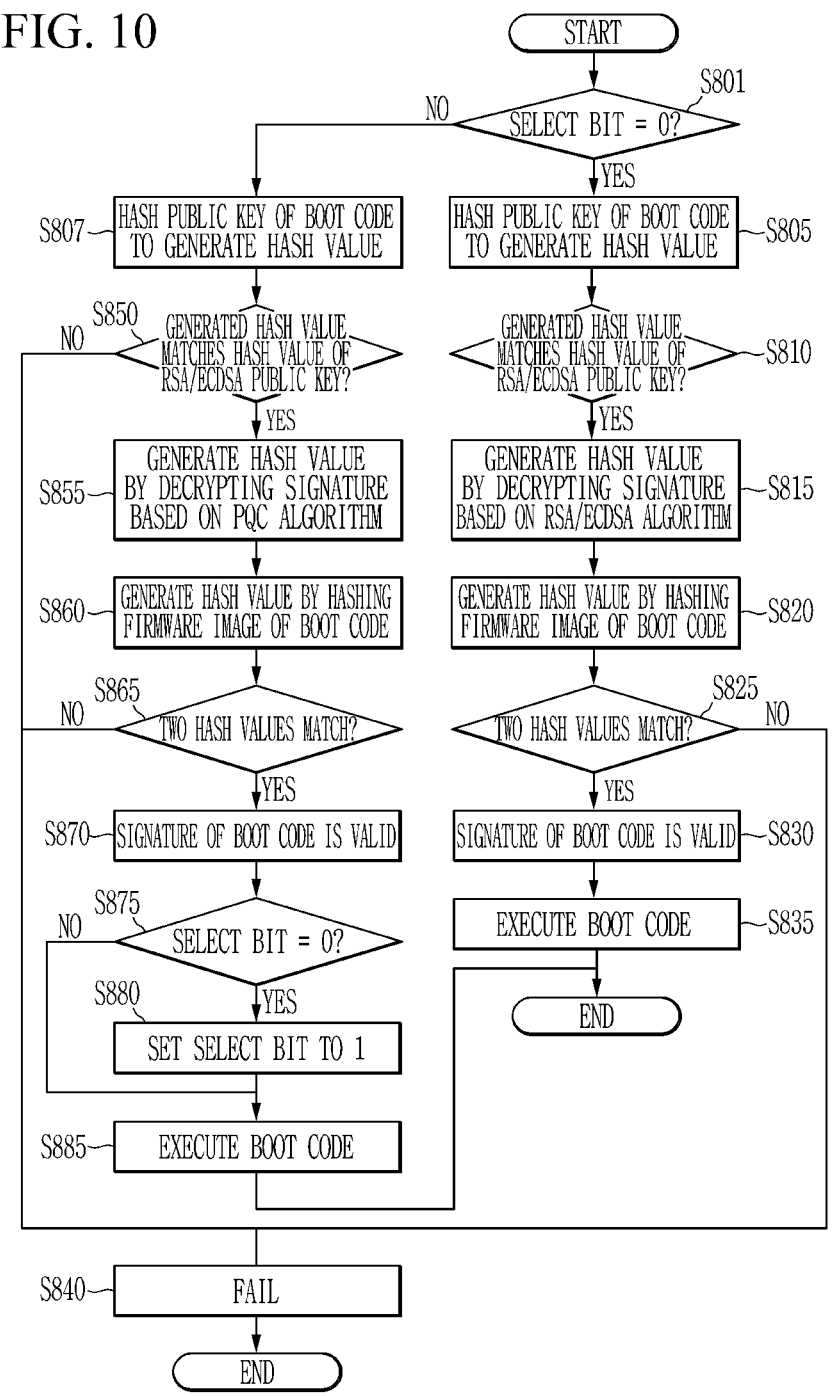

Referring to FIGS. 8 and 9, the processor 210 may hash a public key (i.e., a public key of a firmware signer) 930 of the first stage signed mutable boot code 900 loaded into a memory to generate a hash value 931 in S805, and compare the hash value 931 of the public key with a hash value 940 of an RSA/ECDSA public key stored in the ROM 222 in S810. In some embodiments, the processor 210 may apply a hash function to the public key 930 to generate the hash value 931. The hash value may be referred to as a digest. The hash function may be a hash function of a secure hash algorithm, for example, such as SHA-2 or SHA-3, and a digest size of the hash function may be, for example, 256 or 384, though present embodiments are not necessarily limited thereto, and embodiments may use alternative secure hash functions with varying digest sizes. In some embodiments, the processor 210 may determine whether the hash value 931 corresponds to a hash value of an RSA/ECDSA public key or a hash value of a PQC public key prior to S805 and, if the hash value 931 corresponds to the hash value of the RSA/ECDSA public key, compare the hash value 931 of the public key with the hash value 940 of the RSA/ECDSA public key in S810.

If the hash value 931 matches (e.g., is equal to) the hash value 940 in S810, the processor 210 may determine that verification of the public key is successful, and may check a select bit (e.g., 223 in FIG. 2) of an OTP memory (e.g., 223a in FIG. 2) in S811. If the select bit 223a is set to a first value (e.g., '0') in S811, the processor 210 may generate a hash value 921 by decrypting a signature 920 of the first stage signed mutable boot code 900 using the public key 930 of the first stage signed mutable boot code 900 based on the RSA/ECDSA algorithm in S815. Further, the processor 210 may generate a hash value 911 by hashing a firmware image 910 of the first stage signed mutable boot code 900 in S820. The processor 210 may verify the first stage signed mutable boot code 900 by comparing the hash value 911 of the first stage signed mutable boot code 900 with the hash value 921 decrypted from the signature 920 in S825. For example, the processor 210 may verify the signature 920 of the first stage signed mutable boot code 900 in S825.

If the hash values 921 matches (e.g., is equal to) the hash value 911 in S825, the processor 210 may determine that the first stage signed mutable boot code 900 is valid in S830. For example, the processor 210 may determine that the signature 920 of the first stage signed mutable boot code 900 is valid in S830. If the first stage signed mutable boot code 900 is valid in S830, the processor 210 may execute the first stage signed mutable boot code 900 in S835. If the hash values 921 does not matches the hash value 911 in S825, the processor 210 may determine that the first stage signed mutable boot code 900 is invalid. In this case, the processor 210 may determine that the signature 920 of the first stage signed mutable boot code 900 is invalid. In some embodiments, if the first stage signed mutable boot code 900 is invalid, the processor 210 may fail in the secure boot in S840. In some other embodiments, if the first stage signed mutable boot code 900 is invalid, the processor 210 may perform operations to load, verify, and execute the different first stage signed mutable boot code.

On the other hand, if the select bit 223*a* is set to a second value (e.g., '1'), this may indicate that the system has been previously configured for a PQC cryptographic algorithm. Accordingly, even when the hash value 931 of the public key matches the hash value 940 of the RSA/ECDSA public key, the processor 210 may fail in the secure boot in S811. In a state where the PQC algorithm has been already applied (i.e., the select bit 223*a* has been set to the second value during a boot or update process), then it is possible to prevent a hacker from using the RSA/ECDSA public key by ensuring that the secure boot is performed with the hash value 950 of the PQC public key stored in the ROM 222.

If the hash value 931 does not match the hash value 940 in S810, the processor 210 may compare the hash value 931 of the public key 930 of the first stage signed mutable boot code 900 with the hash value 950 of the PQC public key stored in the ROM 222 in S850. In some embodiments, the processor 210 may determine whether the hash value 931 corresponds to a hash value of the RSA/ECDSA public key or a hash value of the PQC public key before an operation of S805, and if it corresponds to the hash value of the PQC public key, the processor may compare the hash value 931 of the public key with the hash value 940 of the PQC public key in S850.

If the hash value 931 matches (e.g., is equal to) the hash value 950 in S850, the processor 210 may determine that the verification of the public key is successful, and may generate a hash value 922 by decrypting the signature 920 of the first stage signed mutable boot code 900 using the public key 930 of the first stage signed mutable boot code 900 based on the PQC algorithm in S855. Further, the processor 210 may generate the hash value 911 by hashing the firmware image 910 of the first stage signed mutable boot code 900 in S860. The processor 210 may verify the first stage signed mutable boot code 900 by comparing the hash value 911 of the first stage signed mutable boot code 900 with the hash value 922 decrypted from the signature 920 in S865. For example, the processor 210 may verify the signature 920 of the first stage signed mutable boot code 900 in S865.

If the hash value 922 matches (e.g., is equal to) the hash value 911 in S865, the processor 210 may determine that the first stage signed mutable boot code 900 is valid in S870. For example, the processor 210 may determine that the signature 920 of the first stage signed mutable boot code 900 is valid in S870. The processor 210 may read the select bit 223*a* of the OTP memory 223, and if the select bit 223*a* is set to the first value in S875, the processor 210 may set the select bit 223*a* to the second value in S880. For example, in this way, the system may configure itself to a post-quantum computing PQC algorithm, thereby preventing pre-quantum computing attacks. In some embodiments, the processor 210 may set the select bit 223*a* to the second value by programming (i.e., blowing) the select bit 223*a* in S880. Further, the processor 210 may execute the first stage signed mutable boot code 900 in S885. If the hash value 922 does not match the hash value 911 in S865, the processor 210 may determine that the first stage signed mutable boot code 900 is invalid. In some embodiments, if the first stage signed mutable boot code 900 is invalid, the processor 210 may fail in the secure boot in S840. In some other embodiments, if the first stage signed mutable boot code 900 is invalid, the processor 210 may perform operations to load, verify, and execute the different first stage signed mutable boot code.

In some embodiments, if the hash value 931 of the public key 930 of the first stage signed mutable boot code 900 does not match both the hash value 940 of the RSA/ECDSA public key and the hash value 950 of the PQC public key in S810 and S850, the processor 210 may fail in the secure boot in S840. In some other embodiments, the processor 210 may perform operations to load, verify, and execute the different first stage signed mutable boot code. In some cases, this path may correspond to an invalid or inauthentic firmware. Accordingly, the system may prevent attacks or unwanted changes by failing the secure boot process.

Referring to FIG. 10, in some embodiments, unlike the embodiments described with reference to FIG. 8, the processor 210 may first check the select bit 223*a* of the OTP memory 223 in S801. If the select bit 223*a* is set to the first value (e.g., '0'), the processor 210 may hash the public key 930 of the first stage signed mutable boot code 900 loaded into the memory to generate the hash value 931 in S805, and compare the hash value 931 of the public key with the hash value 940 of the RSA/ECDSA public key stored in the ROM 222 in S810. The processor 210 may perform operations after S815 or S850 based on the result of the comparison, e.g., as described with reference to FIG. 8.

If the select bit 223*a* is set to the second value (e.g., '1') in S801, the processor 210 may hash the public key 930 of the first stage signed mutable boot code 900 loaded into the memory to generate hash value 931 in S807, and perform operations after S850, e.g., as described with reference to FIG. 8.

In some embodiments, unlike FIG. 10, after hashing the public key 930 of the boot code 900 in S805 or S087, the processor 210 may check the select bit 223*a* of the OTP memory 223 in S801. Depending on the value of the select bit 223*a*, the processor 210 may compare the hash value 931 of the public key with the hash value 940 of the RSA/ECDSA public key or the hash value 950 of the PQC public key in S810 or S850.

Figure 11:
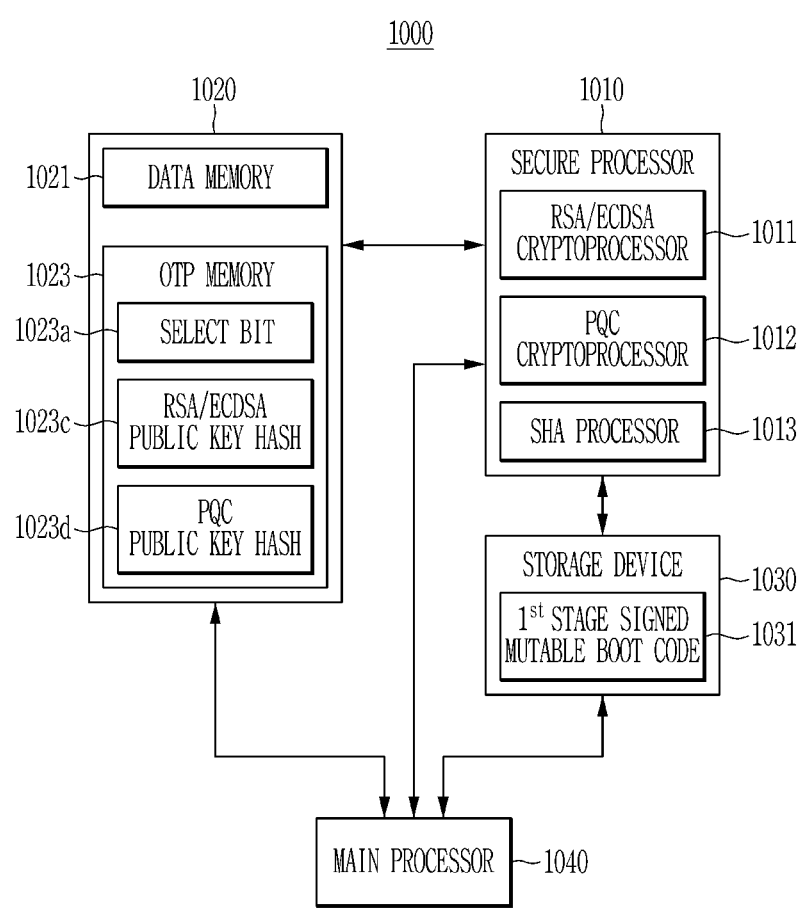
FIG. 11 and FIG. 12 each are a block diagram that illustrates an example of an electronic device according to some embodiments.
Figure 12:
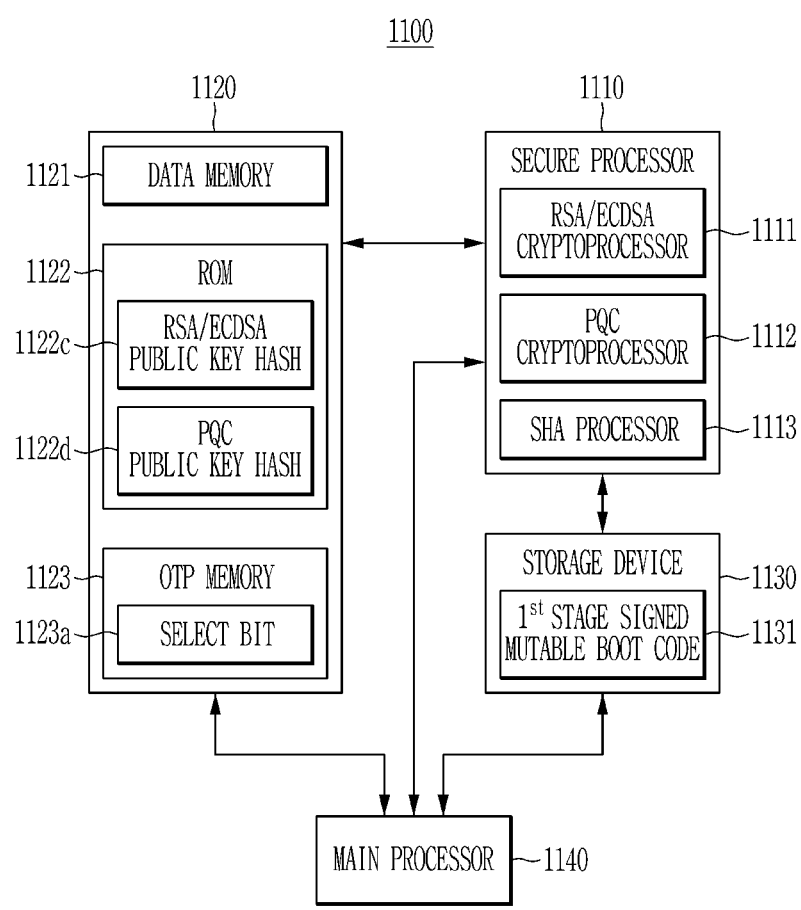

FIG. 11 and FIG. 12 are diagrams that illustrate examples of electronic devices according to some embodiments. In some cases, the electronic devices illustrated with reference to FIGS. 11 and 12 may be configured to execute the methods described with reference to FIGS. 8-10.

Referring to FIG. 11, an electronic device 1000 may include a secure processor 1010, a memory unit 1020, a storage device 1030, and a main processor 1040.

The main processor 1040 may control an overall operation of the electronic device 1000. The main processor 1040 may be implemented as at least one of various processing units, such as a central processing unit (CPU), an application processor (AP), a parallelizable processor such as a GPU, or the like.

The secure processor 1010 may include an RSA/ECDSA cryptoprocessor 1011 and a PQC cryptoprocessor 1012. The RSA/ECDSA cryptoprocessor 1011 and the PQC cryptoprocessor 1012 each may be an integrated circuit such as a coprocessor, a dedicated SoC, or a microprocessor, or a secure element for performing cryptographic operations. In some embodiments, the RSA/ECDSA cryptoprocessor 1011 and the PQC cryptoprocessor 1012 may be implemented as separate integrated circuits or secure elements, or may be implemented as a single integrated circuit or secure element. The RSA/ECDSA cryptoprocessor 1011 may execute an RSA/ECDSA algorithm, and the PQC cryptoprocessor 1012 may execute a PQC algorithm. In some embodiments, the RSA/ECDSA cryptoprocessor 1011 and/or the PQC cryptoprocessor 1012 may include an SHA circuitry that applies a hash function to an input message to generate a hash value. In some other embodiments, the secure processor 1010 may include an SHA processor 1013 that applies the hash function to the input message to generate the hash value, as shown in FIG. 10. In some embodiments, the RSA/ECDSA cryptoprocessor 1011 or the PQC cryptoprocessor 1012 may include a quantum computing unit configured to execute a cryptographic algorithm.

The memory unit 1020 may include a data memory 1021 and an OTP memory 1023. In some embodiments, the memory unit 1020 may be implemented separately from the secure processor 1010. In some other embodiments, at least one of the data memory 1021 and the OTP memory 1023 may be implemented as an integrated circuit together with the main processor 1040 and/or the secure processor 1010. For example, the electronic device 1000 may include a system-on-chip (SoC) comprising the data memory 1021, the OTP memory 1023, the main processor 1040, the secure processor 1010, or a combination thereof.

The data memory 1021 may be a memory that is accessed and used by the main processor 1040 and/or the secure processor 1010, and may include a RAM such as an SRAM or a DRAM.

The OTP memory 1023 may include a select bit 1023*a*. Further, the OTP memory 1023 may store a hash value 1023*c* of an RSA/ECDSA public key and a hash value 1023*d* of a PQC public key as an immutable anchor. In some embodiments, the hash value 1023*c* of the RSA/ECDSA public key and the hash value 1023*d* of the PQC public key may be provisioned at a time of manufacturing of the electronic device 1000. For example, the hash value 1023*c* of the RSA/ECDSA public key and the hash value 1023*d* of the PQC public key may be written to the OTP memory 1023 at the time of manufacturing of the electronic device 1000.

The storage device 1030 may store the first stage signed mutable boot code 1031. The storage device 1030 may be implemented as a non-volatile memory.

The main processor 1040 may load the first stage signed mutable boot code 1031 into the data memory 1021 and control one of the RSA/ECDSA cryptoprocessor 1011 and the PQC cryptoprocessor 1012 to verify the first stage signed mutable boot code 1031. The main processor 1040 may control one of the RSA/ECDSA cryptoprocessor 1011 and the PQC cryptoprocessor 1012 to verify the first stage signed mutable boot code 1031 based on a value of the select bit 1023*a* in the OTP memory 1023. If the select bit 1023*a* of the OTP memory 1023 has a first value (e.g., '0'), the RSA/ECDSA cryptoprocessor 1011, under a control of the main processor 1040, may verify a digital signature of the first stage signed mutable boot code 1031. In some embodiments the main processor 1040 may load the hash value 1023*c* of the RSA/ECDSA public key from the OTP memory 1023 and pass it to the RSA/ECDSA cryptoprocessor 1011 and verify the digital signature. In some embodiments, the RSA/ECDSA cryptoprocessor 1011 may load the hash value 1023*c* of the RSA/ECDSA public key from the OTP memory 1023.

If the select bit 1023*a* of the OTP memory 1023 has the second value (or a predetermined value) (e.g., '1'), the PQC cryptoprocessor 1012 may verify the digital signature of the first stage signed mutable boot code 1031.

If the RSA/ECDSA cryptoprocessor 1011 fails to verify the digital signature of the first stage signed mutable boot code 1031, the PQC cryptoprocessor 1012, under a control of the main processor 1040, may verify the digital signature of the first stage signed mutable boot code 1031. In some embodiments the main processor 1040 may load a hash value 1023*d* of the PQC public key from the OTP memory 1023 and pass it to the PQC cryptoprocessor 1012 and verify the digital signature. In some other embodiments, the PQC cryptoprocessor 1012 may load the hash value 1023*d* of the PQC public key from the OTP memory 1023.

If the PQC cryptoprocessor 1012 is successful in verifying the digital signature of the first stage signed mutable boot code 1031, the main processor 1040 may set the select bit 1023*a* to the second value.

The electronic device 1000 may perform operations similar to the electronic device 200 or 300 described with reference to FIG. 2 or FIG. 3, except that instead of loading the RSA/ECDSA algorithm and the PQC algorithm stored in the ROM, the secure processor 1010 may perform the operations of the RSA/ECDSA algorithm and the PQC algorithm, so a detailed description thereof is omitted.

Referring to FIG. 12, an electronic device 1100 may include a secure processor 1110, a memory unit 1120, a storage unit 1130, and a main processor 1140. The secure processor 1110 may include an RSA/ECDSA cryptoprocessor 1111 and a PQC cryptoprocessor 1112. In some embodiments, the secure processor 1110 may further include an SHA processor 1113. The memory unit 1120 may include a data memory 1121, an ROM 1122, and an OTP memory 1123. The OTP memory 1123 may include a select bit 1123*a*, and the storage device 1130 may store the first stage signed mutable boot code 1131.

As shown in FIG. 12, the ROM 1122 may store a hash value 1122*c* of an RSA/ECDSA public key and a hash value 1122*d* of a PQC public key rather than the OTP memory. Accordingly, the electronic device 1100 may operate similarly to the electronic device 1000 described with reference to FIG. 11, except that the main processor 1040 and/or the secure processor 1110 may load the hash value 1122*c* of the RSA/ECDSA public key and the hash value 1122*d* of the PQC public key from the ROM 1122 instead of the OTP memory 1123, so a detailed description thereof is omitted.

Figure 13:
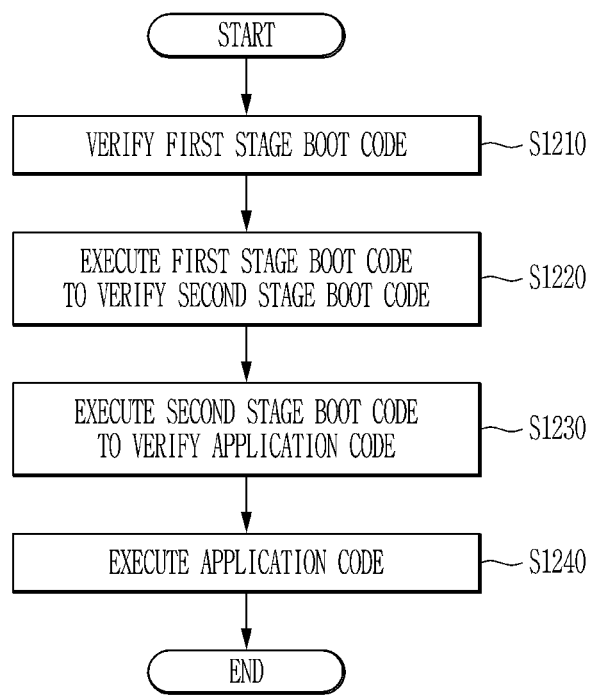
FIG. 13 is a flowchart that illustrates an example of a secure boot according to some embodiments.

FIG. 13 is a flowchart that illustrates an example of a secure boot according to some embodiments.

Referring to FIG. 13, an electronic device may verify the first stage boot code using a hash value of an RSA/ECDSA public key or a hash value of a PQC public key stored as an immutable anchor in a memory in S1210. In some embodiments, the boot code may be a signed mutable boot code. In some embodiments, the electronic device may verify the first stage boot code by executing an immutable boot code stored in the memory (e.g., an ROM) in S1210.

If the verification of the first stage boot code is successful, the electronic device may execute the first stage boot code to verify the second stage boot code in S1220. If the verification of the second stage boot code is successful, the electronic device may execute the second stage boot code to verify an application code in S1230. If the verification of the application code is successful, the electronic device may execute the application code in S1240.

In this way, the electronic device may perform a secure boot and a firmware update while maintaining a chain of trust. FIG. 13 illustrates a two-stage boot code; however, the number of stages may vary according to embodiments, and one, three, or more stages of boot code may be used.

While the invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. An electronic device comprising:
a one-time programmable (OTP) memory configured to store a select bit;
a storage device configured to store a boot code; and
a processor configured to verify the boot code based on the select bit, wherein the processor verifies the boot code based on a pre-quantum cryptography algorithm when the select bit has a first value, and wherein the processor verifies the boot code based on a post-quantum cryptography algorithm when the select bit has a second value.

2. The electronic device of claim 1, wherein the processor is further configured to verify the boot code based on the post-quantum cryptography algorithm if the processor fails to verify the boot code based on the pre-quantum cryptography algorithm.

3. The electronic device of claim 2, wherein the processor is further configured to program the select bit to the second value if the select bit has the first value when the processor succeeds in verifying the boot code based on the post-quantum cryptography algorithm.

4. The electronic device of claim 3, wherein the OTP memory is further configured to be immutable after the select bit is programmed to the second value.

5. The electronic device of claim 1, further comprising a read-only memory storing the pre-quantum cryptography algorithm, the post-quantum cryptography algorithm, a hash value of a pre-quantum cryptography public key, and a hash value of a post-quantum cryptography public key.

6. The electronic device of claim 1, wherein further comprising a read-only memory storing the pre-quantum cryptography algorithm and the post-quantum cryptography algorithm,
and wherein the OTP memory is configured to store a hash value of a pre-quantum cryptography public key and a hash value of a post-quantum cryptography public key.

7. The electronic device of claim 1, wherein the boot code comprises a public key, a signature, and a firmware or system image, and
wherein the processor is further configured to:
hash the public key to generate a first hash value; and
verify the public key by comparing the first hash value with a second hash value of a pre-quantum cryptography public key when the select bit has the first value.

8. The electronic device of claim 7, wherein the processor is further configured to:
generate a third hash value by decrypting the signature using the public key based on the pre-quantum cryptography algorithm when the first hash value matches the second hash value;
hash the firmware or system image to generate a fourth hash value; and
compare the third hash value with the fourth hash value to verify the boot code.

9. The electronic device of claim 7, wherein the processor is further configured to compare the first hash value with a third hash value of a post-quantum cryptography public key to verify the public key when failing in verifying the public key.

10. The electronic device of claim 9, wherein the processor is further configured to:
generate a fourth hash value by decrypting the signature using the public key based on the post-quantum cryptography algorithm when the first hash value matches the third hash value;
hash the firmware or system image to generate a fifth hash value; and
compare the fourth hash value with the fifth hash value to verify the boot code.

11. The electronic device of claim 1, wherein the boot code comprises a public key, a signature, and an image,
wherein the processor is further configured to:
hash the public key to generate a first hash value;
compare the first hash value with a second hash value of a pre-quantum cryptography public key; and
output a failure signal that indicates verification of the boot code has failed when the first hash value matches the second hash value and the select bit has the second value.

12. The electronic device of claim 1, wherein the boot code is a first stage signed mutable boot code in a secure boot.

13. An electronic device comprising:
a one-time programmable (OTP) memory configured to store a select bit;
a storage device configured to store a boot code;
a pre-quantum cryptography cryptoprocessor configured to execute a pre-quantum cryptography algorithm to verify the boot code when the select bit has a first value; and
a post-quantum cryptography cryptoprocessor configured to execute a post-quantum cryptography algorithm to verify the boot code when the select bit has a second value.

14. The electronic device of claim 13, wherein the post-quantum cryptography cryptoprocessor is further configured to execute the post-quantum cryptography algorithm to verify the boot code if the pre-quantum cryptography cryptoprocessor fails to verify the boot code.

15. The electronic device of claim 14, further comprising main processor configured to program the select bit to the second value when the post-quantum cryptography cryptoprocessor succeeds in verifying the boot code and the select bit has the first value.

16. The electronic device of claim 13, further comprising a read-only memory configured to store a hash value of a pre-quantum cryptography public key and a hash value of a post-quantum cryptography public key.

17. The electronic device of claim 13, wherein the OTP memory is further configured to store a hash value of a pre-quantum cryptography public key and a hash value of a post-quantum cryptography public key.

18. A method of performing a secure boot of an electronic device, comprising:
- loading a first boot code;
- determining a first value of a select bit stored in a one-time programmable (OTP) memory;
- attempting, based on the first value of the select bit, to verify the first boot code using a pre-quantum cryptography algorithm;
- determining that the attempt to verify the first boot code using the pre-quantum cryptography algorithm has failed;
- verifying the first boot code using a post-quantum cryptography algorithm based on the determination or based on the select bit being a second value; and
- setting the select bit to the second value indicating post-quantum cryptography.

19. The method of claim 18, further comprising:
- loading a second boot code;
- checking the select bit; and
- verifying the second boot code based on the post-quantum cryptography algorithm and based on the select bit.

20. The method of claim 18, wherein setting the select bit to the second value comprises programming the select bit stored in a one-time programmable memory to the second value, wherein the one-time programmable memory becomes immutable upon after the programming.

* * * * *